Nov. 29, 1938.  A. A. KNOSSALLA  2,138,303
AUTOMOBILE HEADLIGHT TURNING DEVICE
Filed Aug. 25, 1937
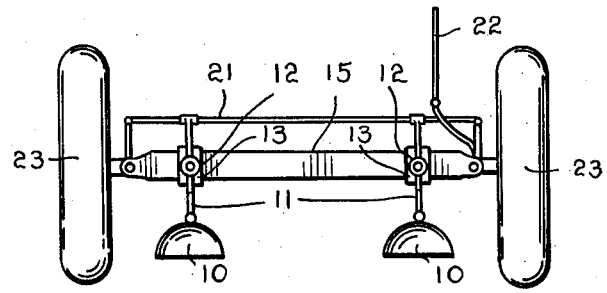
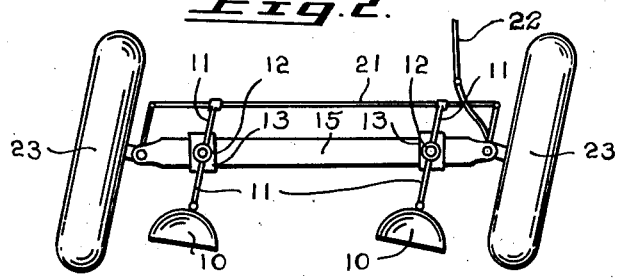
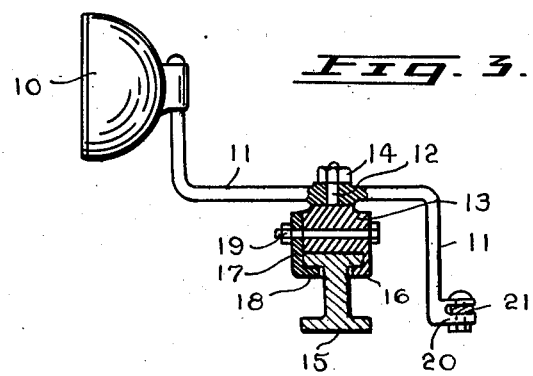
INVENTOR
Albert A. Knossalla
By Ralph Burch
Attorney Patented Nov. 29, 1938

2,138,303

UNITED STATES PATENT OFFICE 2,138,303

AUTOMOBILE HEADLIGHT TURNING DEVICE

Albert Alphonse Knossalla, St. Walburg, Saskatchewan, Canada

Application August 25, 1937, Serial No. 160,922

1 Claim. (Cl. 240—62.72)

This invention relates to improvements in an automobile head light turning device. Its primary object being to provide means actuated by the steering mechanism of the automobile to turn the head lights in the direction of the front wheels.

A further object of the invention is to devise a pivotally mounted head light that may be used as an auxiliary light and detachably mounted on the front axle of an automobile and associated with the steering mechanism in a manner to turn in conjunction with the front wheels.

A still further object of the invention is to provide one or a pair of head lights to be pivotally mounted in detachable brackets on the front axle and having means associated therewith to be actuated by the steering mechanism to direct a beam of light in the direction of the front wheels.

With these and other objects in view that may appear while the description proceeds the invention consists in the novel construction and arrangement of parts as hereinafter more specifically set forth, claimed and shown in the accompanying drawing forming part of this application and in which:—

Fig. 1 is a plan view of my invention showing the head lamps pointing directly forward.

Fig. 2 is a plan view showing the lamps slightly turned in conjunction with the front wheels.

Fig. 3 is a detail view of the detachable mounting for the lamp.

Referring more in detail to the drawing in which similar reference characters designate corresponding parts throughout the several views it will be seen the invention comprises a pair of standard lamps 10 supported on arms 11. Said arms being pivotally mounted on pivot pins 12 formed on brackets 13 and retained on said pins by nuts 14 or in any other convenient manner. The brackets 13 are detachably secured to the front axle 15 by a hooked lip 16 formed thereon and by a clamp 17 having a corresponding hooked lip 18. The clamp is secured to the bracket by a bolt 19 in a manner to grip the axle between the said lips and securely hold the same thereon.

The arms 11 extend rearwardly and downward from the pivotal point and terminate in a bifurcated end 20 which is arranged to engage the tie rod 21 which is actuated by the steering mechanism 22 and controls the pivotal movement of the front wheels 23.

From the foregoing it will be seen the device may be installed as a permanent fixture on an automobile or as an auxiliary fixture and sold as an accessory therefore. The mechanism being of extreme simplicity for the purpose of easy attachment to the front axle of any make of car. The lamp or when a pair are used being arranged as previously set forth to direct a beam of light along the path of the automobile and more particularly so when the vehicle is rounding a corner or a curve on the highway.

It is believed that the construction and advantages of the structure shown may be apparent from the foregoing paragraphs taken in conjunction with the accompanying drawing without further detailed description.

While the preferred embodiment of the invention has been disclosed it is understood that minor changes in the details of construction, combination and arrangement of co-operating parts may be resorted to within the scope of what is claimed without departing from the spirit of the invention.

I claim:

In a dirigible headlight structure for automobiles comprising supporting clamps including a block for mounting on top of the front axle of the automobile having a downwardly and inwardly extending integral lip for gripping one side of the axle and a jaw removably secured to the block for gripping the other side of the axle, pivot pins extending vertically from the center of the supporting clamps, supporting arms pivotally mounted on said pivot pins to swing in a horizontal plane having one end bent upwardly to support the headlamps and their opposite ends bent downwardly and outwardly for connection with the connecting rod of the steering mechanism of the automobile.

ALBERT ALPHONSE KNOSSALLA.